(12) United States Patent
Bando et al.

(10) Patent No.: US 10,263,448 B2
(45) Date of Patent: Apr. 16, 2019

(54) POWER STORAGE SYSTEM AND METHOD OF CONTROLLING THE SAME

(71) Applicant: KAWASAKI JUKOGYO KABUSHIKI KAISHA, Kobe-shi, Hyogo (JP)

(72) Inventors: Soichiro Bando, Kobe (JP); Masato Hayashi, Kobe (JP); Mikihiko Kataoka, Kobe (JP); Takayuki Tokushige, Kobe (JP); Tatsuya Ohno, Nishinomiya (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 231 days.

(21) Appl. No.: 15/318,304

(22) PCT Filed: Jun. 10, 2015

(86) PCT No.: PCT/JP2015/002905
§ 371 (c)(1),
(2) Date: Dec. 12, 2016

(87) PCT Pub. No.: WO2015/190094
PCT Pub. Date: Dec. 17, 2015

(65) Prior Publication Data
US 2017/0126025 A1    May 4, 2017

(30) Foreign Application Priority Data
Jun. 11, 2014   (JP) .................................. 2014-120288

(51) Int. Cl.
*H02J 7/00*   (2006.01)
*H02J 7/14*   (2006.01)
*H02J 7/34*   (2006.01)

(52) U.S. Cl.
CPC ............ *H02J 7/007* (2013.01); *H02J 7/0021* (2013.01); *H02J 7/1423* (2013.01); *H02J 7/345* (2013.01)

(58) Field of Classification Search
USPC ......................................................... 320/166
See application file for complete search history.

(56) References Cited

U.S. PATENT DOCUMENTS

| | | | | |
|---|---|---|---|---|
| 2006/0097575 A1* | 5/2006 | Xu | ......................... | B60L 11/005 307/9.1 |
| 2013/0110339 A1* | 5/2013 | Akimasa | ............... | H02J 7/1438 701/22 |
| 2015/0311831 A1 | 10/2015 | Yamada et al. | | |

FOREIGN PATENT DOCUMENTS

| | | |
|---|---|---|
| EP | 2173018 A1 | 4/2010 |
| EP | 2353925 A2 | 8/2011 |

(Continued)

OTHER PUBLICATIONS

Noumi et al. "The Method of Determining the Mass of Energy Storage Device fo Extension of Battery Life and Loss Reduction for Batteries ans EDLCs Hybrid System", IEE—Japan Industry Applications Society Conference, pp. 125-128, 2013.

(Continued)

*Primary Examiner* — Robert J Grant
(74) *Attorney, Agent, or Firm* — Oliff PLC

(57) ABSTRACT

A power storage system supplies electric power to a load, and includes: a secondary battery; a capacitor connected in parallel to the secondary battery; and a controller performing control to prioritize charging and discharging of the capacitor over charging and discharging of the secondary battery.

5 Claims, 11 Drawing Sheets

(56) References Cited

FOREIGN PATENT DOCUMENTS

| | | | |
|---|---|---|---|
| JP | H08-308025 A | 11/1996 |
| JP | H10-80007 A | 3/1998 |
| JP | 2002-95174 A | 3/2002 |
| JP | 2010-288414 A | 12/2010 |
| JP | 2011-182540 A | 9/2011 |
| WO | 2012/017602 A1 | 2/2012 |
| WO | 2014/073058 A1 | 5/2014 |

OTHER PUBLICATIONS

Jul. 7, 2015 International Search Report issued in International Patent Application No. PCT/JP2015/002905.
Jul. 7, 2015 Written Opinion issued in International Patent Application No. PCT/JP2015/002905.
Jan. 23, 2018 Extended European Search Report issued in European Patent Application No. 15806373.5.

* cited by examiner

[Fig. 1]
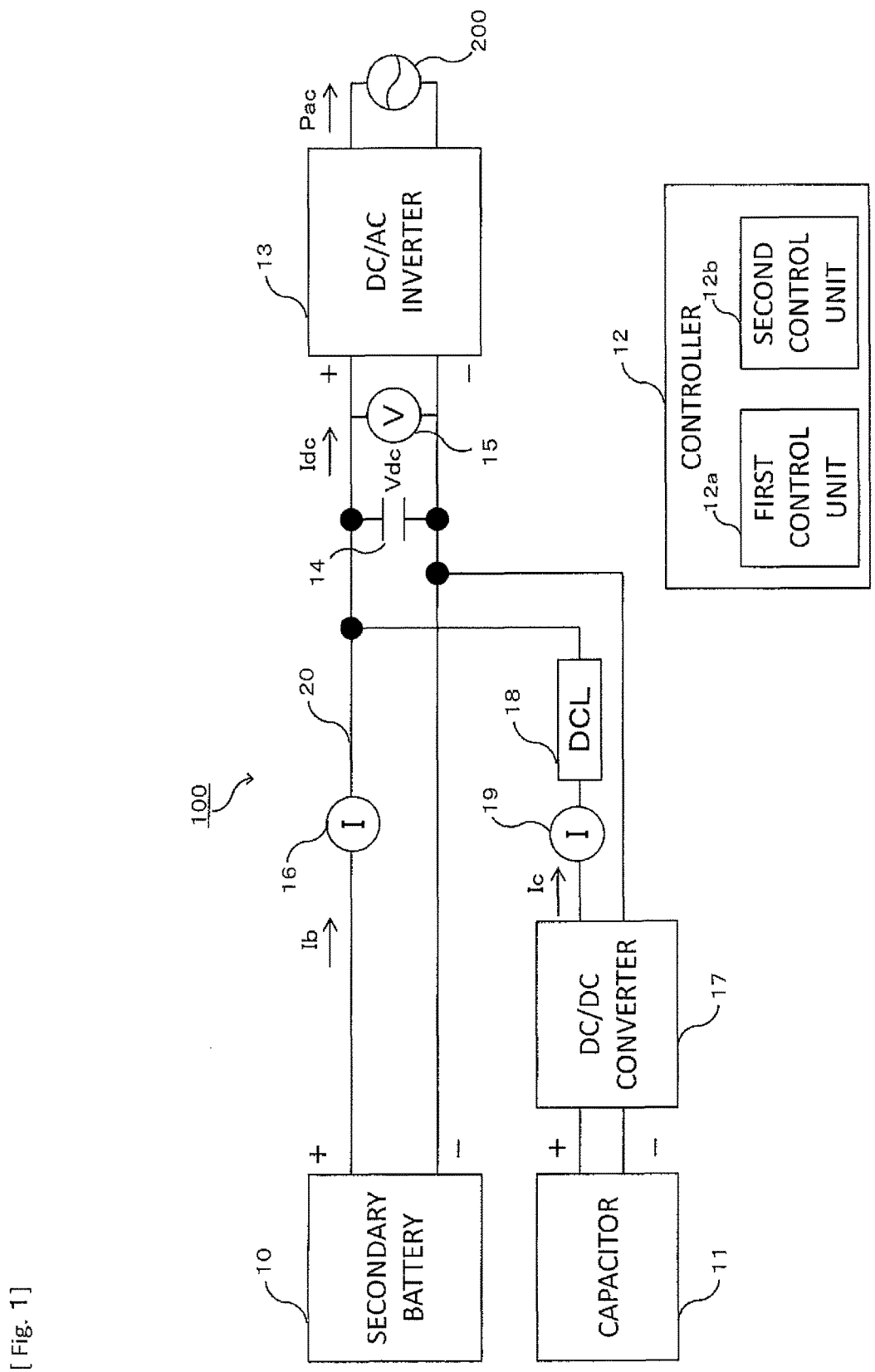

[Fig. 2]
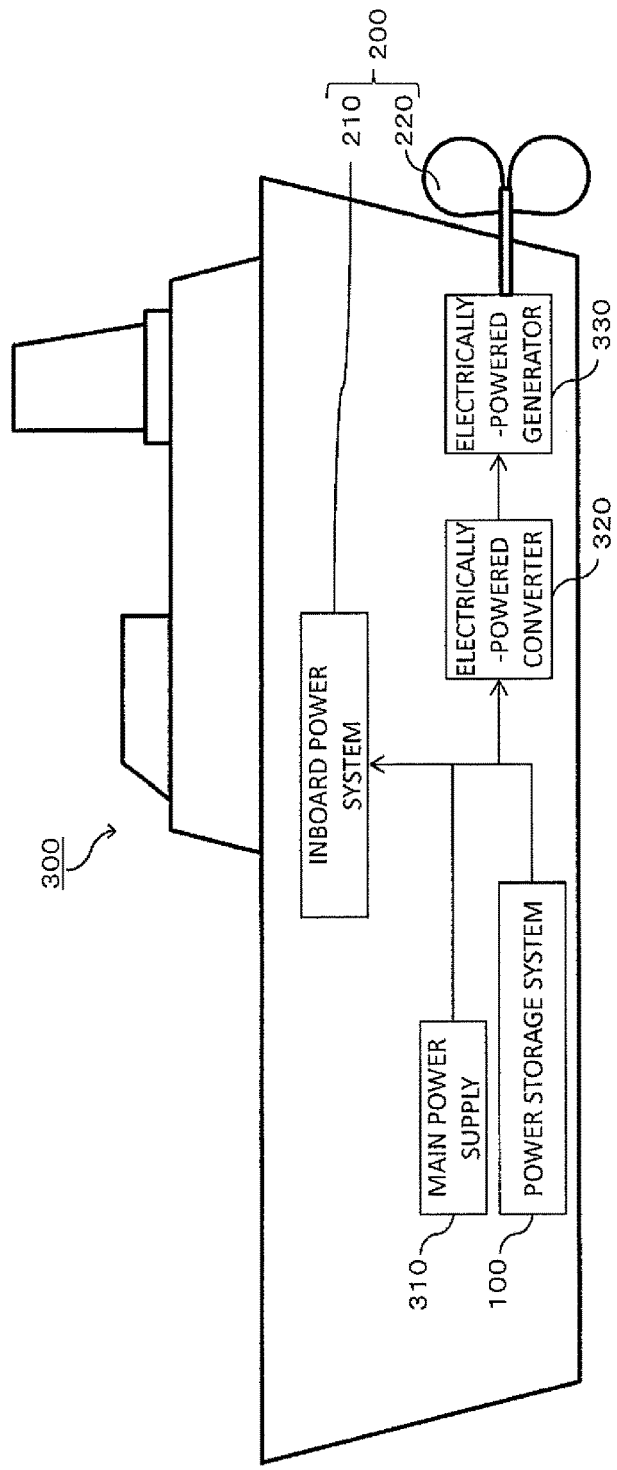

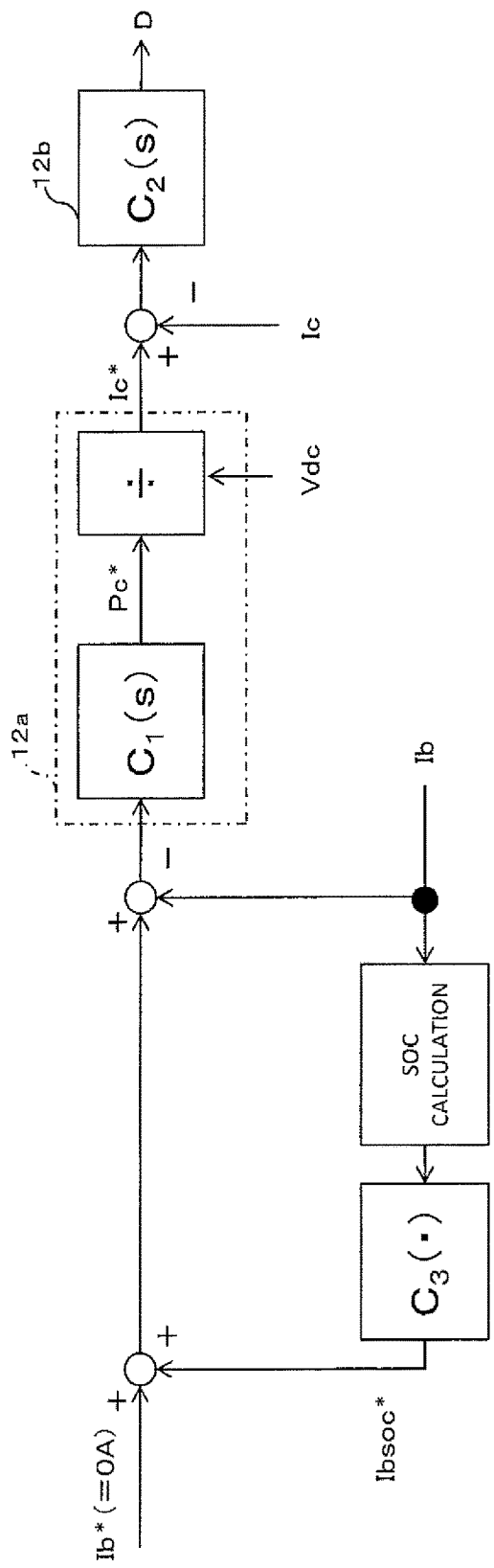
[Fig. 3]

[Fig. 4]
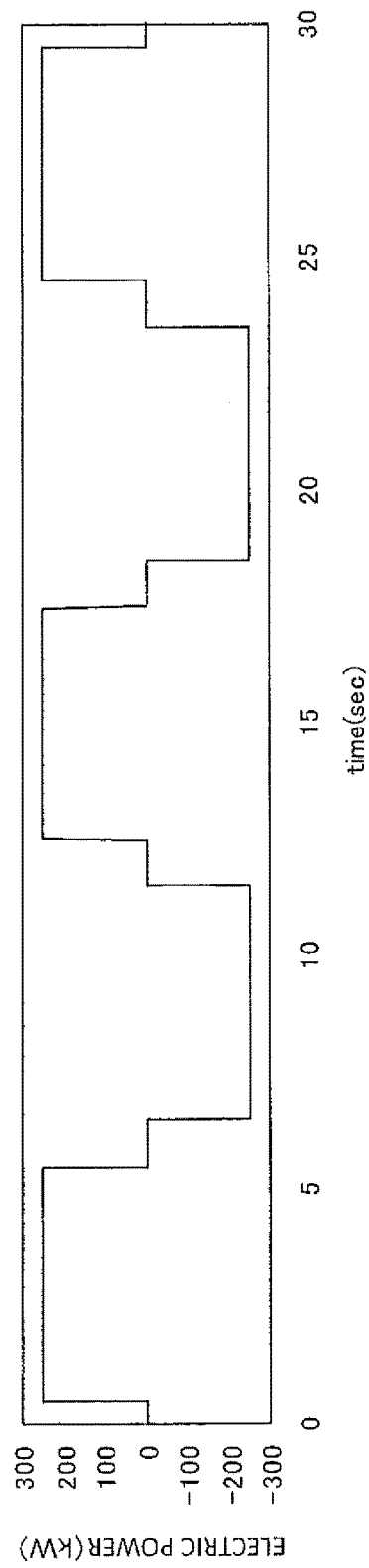

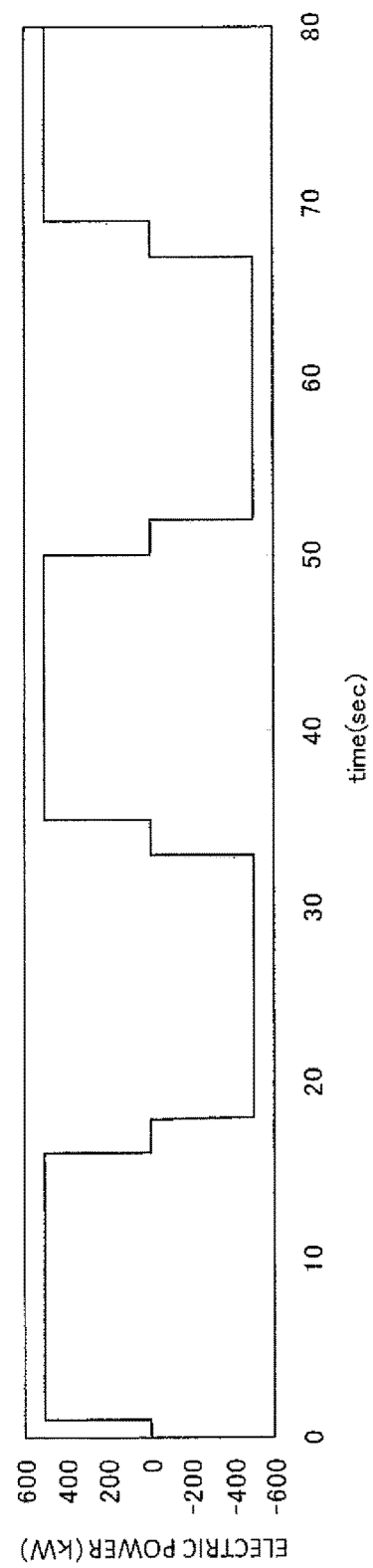
[Fig. 5]

[Fig. 6]
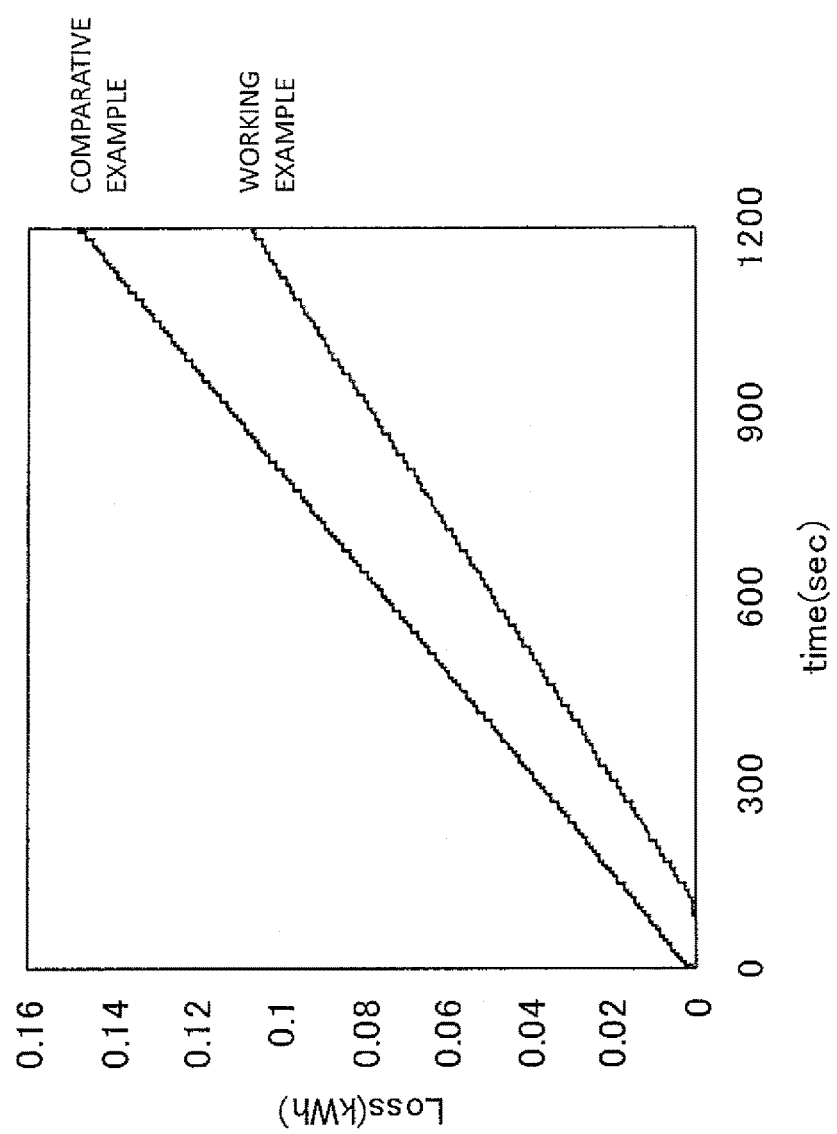

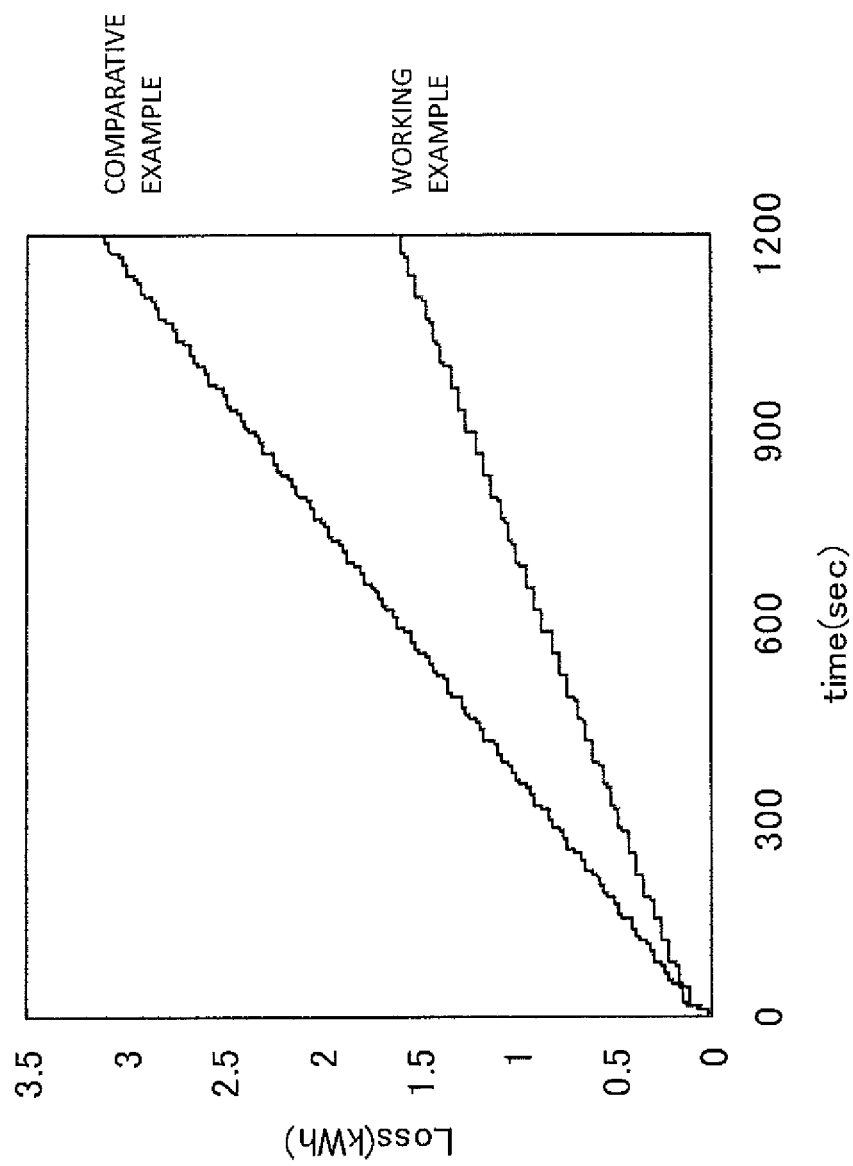
[Fig. 7]

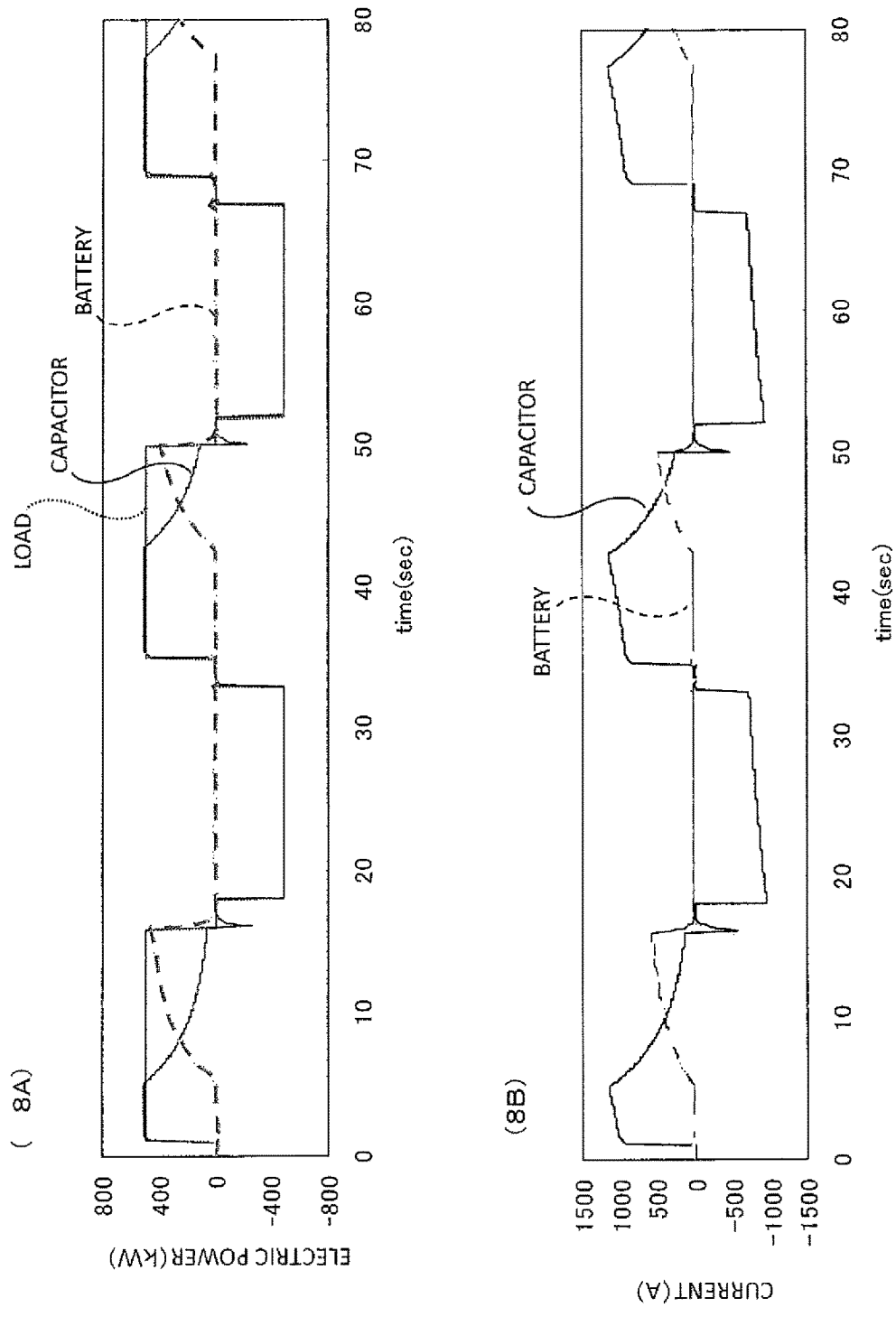

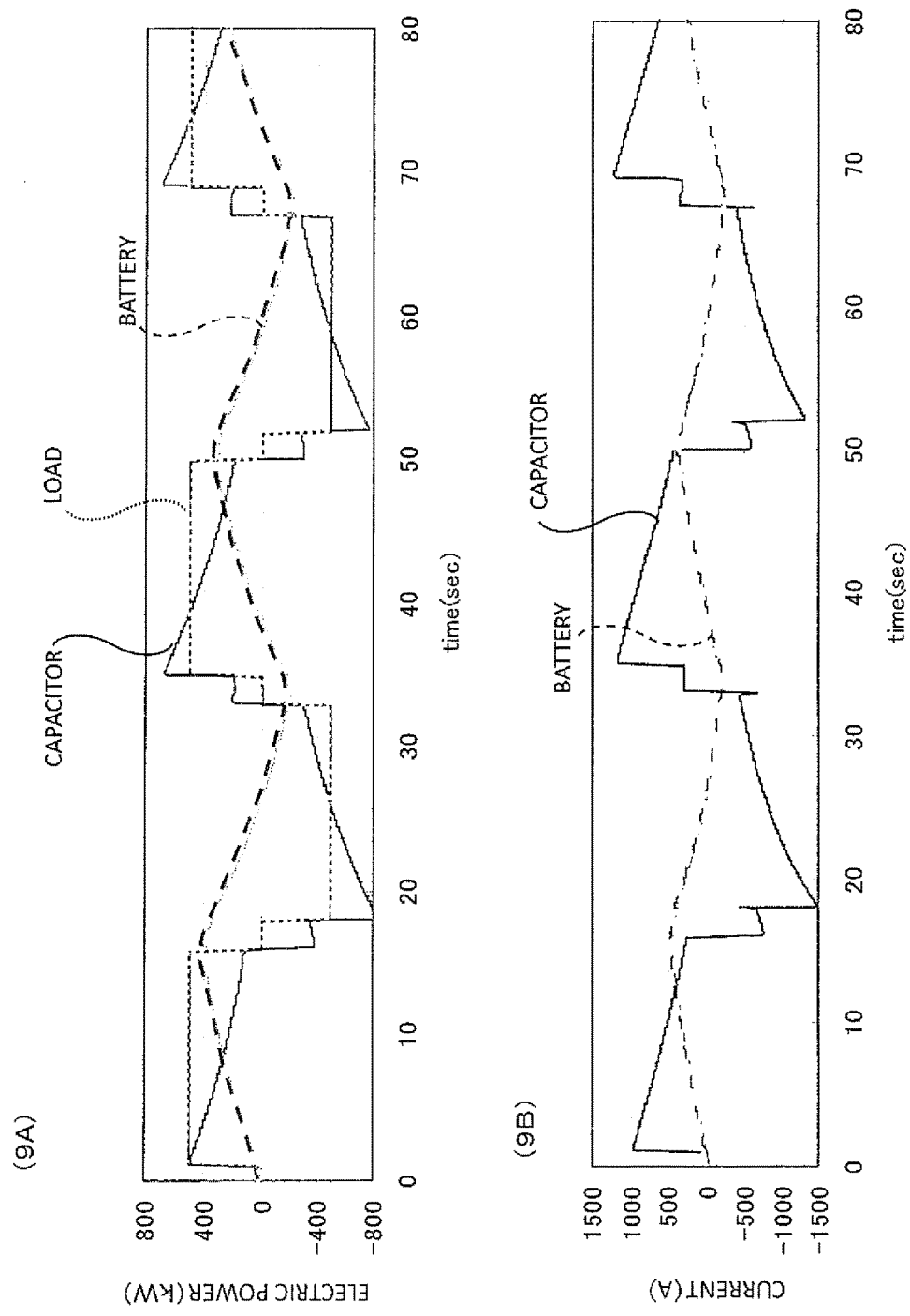
[Fig. 9]

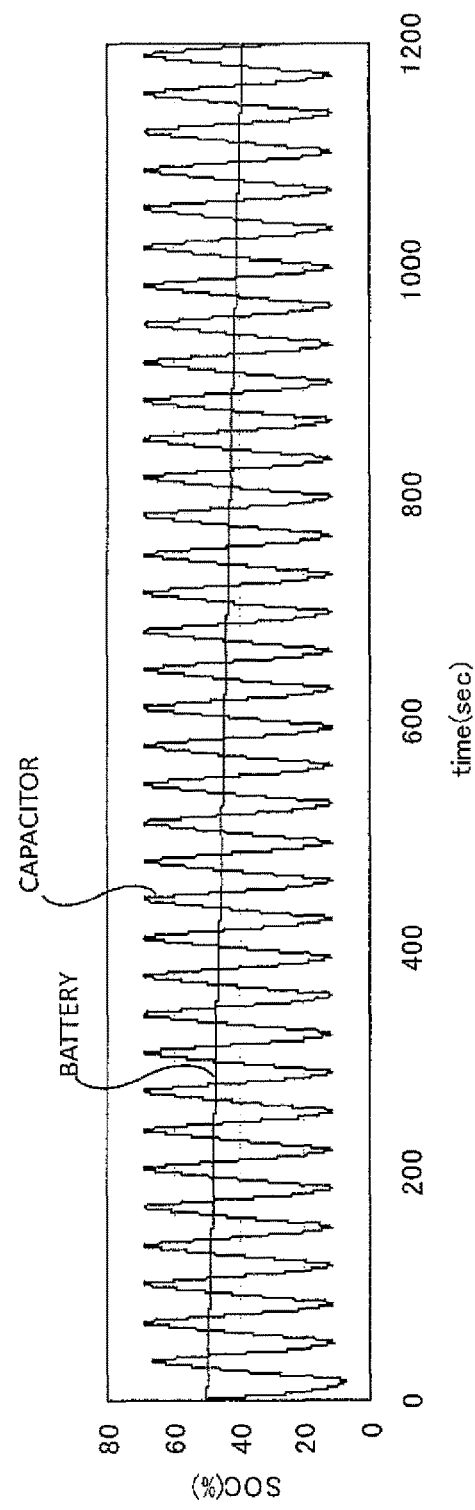
[Fig. 10]

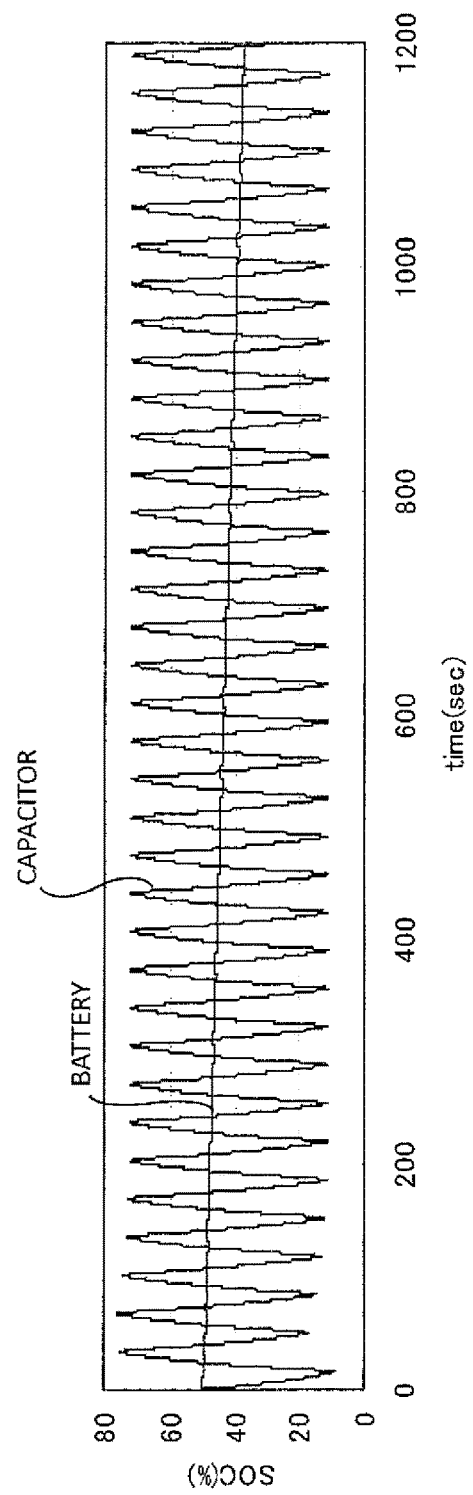
[Fig. 11]

POWER STORAGE SYSTEM AND METHOD OF CONTROLLING THE SAME

TECHNICAL FIELD

The present invention relates to a power storage system including a secondary battery and a capacitor and to a method of controlling the power storage system.

BACKGROUND ART

Conventionally, a hybrid system in which a secondary battery and a capacitor are combined is known as a power storage system that realizes both high energy density and high power density. However, the short life of the secondary battery is a hindrance to the installation of such a hybrid system in a carrier such as a ship. In order to overcome this problem, for example, there is a known hybrid power supply system that is proposed by Non-Patent Literature 1 as a long-lived hybrid system.

In the hybrid power supply system, a battery supplies a low-frequency component of electric power, and an electric double layer capacitor supplies a high-frequency component of electric power. The high-frequency component is separated by an HPF (High Pass Filter), and the time constant $T_{EDLC}$ of the HPF is set based on the capacity and charge/discharge cycle of the capacitor. In order to prevent overcharging and over-discharging of the capacitor, a proportional compensator is used. The proportional gain kp of the proportional compensator is set so that the battery can supply electric power to cover a loss in the capacitor.

CITATION LIST

Patent Literature

NPL 1: Yuki Noumi, Keiichiro Kondo, "The Method of Determining the Mass of Energy Storage Device for Extension of Battery life and Loss Reduction for Batteries and EDLCs Hybrid System", 2013 IEE—Japan Industry Applications Society Conference IV-125 to IV-128.

SUMMARY OF INVENTION

Technical Problem

In the above hybrid power supply system, the control parameters (i.e., the time constant $T_{EDLC}$ of the HPF and the proportional gain kp of the proportional compensator) depend on the characteristics (i.e., the frequency and magnitude) of load fluctuation. For this reason, the hybrid power supply system is poor in versatility.

Specifically, the time constant $T_{EDLC}$ of the HPF, which is based on the capacity and charge/discharge cycle of the capacitor, is set depending on the frequency of load fluctuation. For example, the time constant $T_{EDLC}$ is set to a value that is greater than a time constant T1 (=1/F1) corresponding to the frequency F1 of load fluctuation to be covered by the capacitor and that is less than a time constant T2 (=1/F2) corresponding to the frequency F2 of load fluctuation to be covered by the battery. In this case, if the frequency of load fluctuation changes, for example, due to a change in charge/discharge pattern or due to application to a different system, then the set time constant $T_{EDLC}$ becomes unsuitable for the frequency of load fluctuation that has changed. If T1<T2<$T_{EDLC}$, all the electric power is to be covered by the capacitor. On the other hand, if $T_{EDLC}$<T1<T2, all the electric power is to be covered by the battery. Therefore, it is necessary to adjust the time constant $T_{EDLC}$ in accordance with the frequency of load fluctuation.

Also, the proportional gain kp of the proportional compensator depends on the magnitude of load fluctuation. If the proportional gain kp is too small relative to the magnitude of load fluctuation, a loss in the capacitor cannot be compensated for, and the voltage of the capacitor drops to reach its lower limit. On the other hand, if the proportional gain kp is too large relative to the magnitude of load fluctuation, a function to stabilize the voltage of the capacitor is exerted, which causes an increase in power supply from the battery. Therefore, it is necessary to adjust the proportional gain kp in accordance with the magnitude of load fluctuation.

The present invention has been made to solve the above-described problems. An object of the present invention is to provide a versatile long-lived power storage system and a method of controlling the power storage system.

Solution to Problem

A power storage system according to one aspect of the present invention includes: a power converter whose load-side terminals are connected to a load; a secondary battery connected to power-supply-side terminals of the power converter; a capacitor connected to the power-supply-side terminals of the power converter via a DC/DC converter in parallel to the secondary battery; and a controller controlling the DC/DC converter to prioritize charging and discharging of the capacitor over charging and discharging of the secondary battery.

According to this configuration, the charging and discharging of the secondary battery and the capacitor do not depend on the frequency and magnitude of load fluctuation. Therefore, the power storage system is highly versatile. Since the charging and discharging of the capacitor are prioritized over the charging and discharging of the secondary battery, the number of times of charging and discharging of the secondary battery is less than in a case where the charging and discharging of the capacitor are not prioritized over the charging and discharging of the secondary battery. As a result, the life of the secondary battery is extended. Consequently, the power storage system can be made long-lived.

In the power storage system, the controller may include: a first control unit that generates a target current value of the capacitor based on a deviation of a current of the secondary battery from a predetermined target current value of the secondary battery, the predetermined target current value being zero or close to zero; and a second control unit that generates a conduction ratio of the DC/DC converter based on a deviation of a current of the capacitor from the target current value of the capacitor, and outputs the conduction ratio to the DC/DC converter.

According to this configuration, when load fluctuation occurs, the current of the secondary battery is restrained to the predetermined target current value of the secondary battery. Accordingly, the number of times of charging and discharging of the secondary battery is restrained in accordance with the predetermined target current value of the secondary battery, and thereby the charging and discharging of the capacitor are prioritized over the charging and discharging of the secondary battery.

In the power storage system, the predetermined target current value of the secondary battery may be a current value less than or equal to a one-hour current rate of the secondary battery. The one-hour current rate herein refers to a current value that allows the SOC (State Of Charge) of the secondary battery to be fully charged or to fully discharge in one hour.

According to this configuration, the number of times of charging and discharging of the secondary battery is restrained effectively, and thereby the life of the secondary battery is extended effectively. This consequently makes it possible to extend the life of the power storage system effectively.

In the power storage system, the predetermined target current value of the secondary battery may be zero.

According to this configuration, the number of times of charging and discharging of the secondary battery is restrained most effectively, and the life of the secondary battery can be extended most effectively. This consequently makes it possible to extend the life of the power storage system most effectively.

In the power storage system, the first control unit may be configured to generate the target current value of the capacitor based on a current for keeping SOC of the secondary battery to a predetermined value and the deviation of the current of the secondary battery from the predetermined target current value of the secondary battery.

According to this configuration, the SOC of the secondary battery can be kept to the predetermined value.

A method of controlling a power storage system according to one aspect of the present invention is a method of controlling a power storage system including: a power converter whose load-side terminals are connected to a load; a secondary battery connected to power-supply-side terminals of the power converter; a capacitor connected to the power-supply-side terminals of the power converter via a DC/DC converter in parallel to the secondary battery; and a controller. The method includes controlling, by the controller, the DC/DC converter to prioritize charging and discharging of the capacitor over charging and discharging of the secondary battery.

Advantageous Effects of Invention

The present invention configured as described above is highly versatile and has an advantage of being able to provide a long-lived power storage system and a method of controlling the same.

The above object, other objects, features, and advantages of the present invention will be made clear by the following detailed description of preferred embodiments with reference to the accompanying drawings.

BRIEF DESCRIPTION OF DRAWINGS

FIG. 1 is a functional block diagram showing the configuration of a power storage system according to Embodiment 1 of the present invention.

FIG. 2 schematically shows a ship in which the power storage system of FIG. 1 is installed.

FIG. 3 shows an example of the configuration of a controller of the power storage system of FIG. 1.

FIG. 4 is a graph showing a first charge/discharge pattern of electric power.

FIG. 5 is a graph showing a second charge/discharge pattern of electric power.

FIG. 6 is a graph showing loss amounts of secondary batteries due to charging and discharging in the first charge/discharge pattern.

FIG. 7 is a graph showing loss amounts of the secondary batteries due to charging and discharging in the second charge/discharge pattern.

FIG. 8A is a graph showing the second charge/discharge pattern, electric power of a secondary battery, and electric power of a capacitor in a power storage system of a working example, and FIG. 8B is a graph showing a current of the secondary battery and a current of the capacitor in the power storage system of the working example.

FIG. 9A is a graph showing the second charge/discharge pattern, electric power of a secondary battery, and electric power of a capacitor in a power supply system of a comparative example, and FIG. 9B is a graph showing a current of the secondary battery and a current of the capacitor in the power supply system of the comparative example.

FIG. 10 is a graph showing the SOC of each of the secondary battery and the capacitor in the power storage system of the working example in the case of charging and discharging in the second charge/discharge pattern.

FIG. 11 is a graph showing the SOC of each of the secondary battery and the capacitor in the power supply system of the comparative example in the case of charging and discharging in the second charge/discharge pattern.

DESCRIPTION OF EMBODIMENTS

Hereinafter, embodiments of the present invention are described in detail with reference to the drawings. In the drawings, the same or corresponding elements are denoted by the same reference signs, and repeating the same descriptions is avoided below.

(Embodiment 1)

FIG. 1 is a functional block diagram showing the configuration of a power storage system 100 according to Embodiment 1. FIG. 2 schematically shows a ship 300, in which the power storage system 100 is installed. The use of the power storage system 100 shown in FIG. 1 is not particularly limited. As one example, the power storage system 100 is used in a mobile unit such as a vehicle. The power storage system 100 is, for example, used as an auxiliary power supply of an electric propulsion ship 300 shown in FIG. 2. In the ship 300 of FIG. 2, electric propulsive force (driving force of an electrically-powered generator 330) is used as a main driving source for a propeller 220. However, as an alternative, a main engine (not shown) may be used as a main driving source for the propeller 220, and the electric propulsive force (driving force of the electrically-powered generator 330) may be used as an auxiliary driving source for the propeller 220. It should be noted that the electrically-powered generator 330 is connected to the power storage system 100, a main power supply 310, and an inboard power system 210 via an electrically-powered converter 320.

Normally, while the ship 300 is out at sea, electric power for propelling the ship 300 and electric power to be used in the ship 300 are supplied by the main power supply 310 installed in the ship 300. When a significantly great fluctuation occurs in the electric power, electric power supply from the main power supply 310 is blocked due to overcurrent. In order to avoid such a situation, not only the main power supply 310 but also the power storage system 100, which serves as an auxiliary power supply, is connected to a load 200 of the ship 300 (the load 200 includes, for example, the inboard power system 210 and the electrically-powered generator 330 for driving the propeller 220). Accordingly, the power storage system 100 assists the main power supply 310 as necessary in a manner to supply electric power to the load 200 or receive and store electric power from the load 200. It should be noted that the use of the power storage system 100 is not limited to the auxiliary power supply of the ship 300. As an alternative, the power storage system 100 may be used, for example, as a power storage system for supplying electric power to an automobile or a household.

The power storage system 100 includes a secondary battery 10, a capacitor 11, and a controller 12. The power storage system 100 supplies electric power to the load 200 via a DC/AC inverter 13. Also, the power storage system 100 receives electric power from the load 200, and stores the electric power in one of or both of the secondary battery 10 and the capacitor 11.

Load-side terminals of the DC/AC inverter (power converter) 13 are connected to the load 200. The DC/AC inverter 13 converts DC power inputted to a power-supply-side terminal thereof into AC power, and outputs the AC power from a load-side terminal thereof. Also, the DC/AC inverter 13 converts AC power inputted to a load-side terminal thereof into DC power, and outputs the DC power from a power-supply-side terminal thereof.

The secondary battery 10 and the capacitor 11, which are parallel to each other, are connected the power-supply-side terminals of the DC/AC inverter 13. The capacitor 11 is connected to the power-supply-side terminals of the DC/AC inverter 13 via a DC/DC converter 17.

Specifically, the secondary battery 10 is connected to the power-supply-side terminals of the DC/AC inverter 13 via a DC link 20 formed by a pair of wires, and the capacitor 11 is connected to the DC link 20 via the DC/DC converter 17. A DC link capacitor 14 is connected between the pair of wires that forms the DC link 20.

The DC link capacitor 14 smooths voltage fluctuation of the DC link 20. A voltage sensor 15 is connected in parallel to the DC link capacitor 14. The voltage sensor 15 detects a DC link voltage Vdc (a voltage between both ends of the DC link capacitor 14), which is a voltage of the DC link 20.

The secondary battery 10 is a large-capacity electrical storage device that stores electric charge via chemical reaction or physical reaction, and releases the stored electric charge via reverse reaction. Examples of the secondary battery 10 include a lithium ion battery, a nickel metal hydride battery, and a lead battery. A first current sensor 16 is connected to the secondary battery 10 in series. The first current sensor 16 is provided between the secondary battery 10 and a connection point to the capacitor 11, and detects a current Ib that is discharged from the secondary battery 10 or that charges the secondary battery 10.

The capacitor 11 is a high power electrical storage device that directly stores electric charge (i.e., without any reaction) and that directly releases the stored electric charge. Examples of the capacitor 11 include a lithium ion capacitor and an electric double layer capacitor. The capacitor 11 is connected to the DC link 20 via the DC/DC converter 17. The connection point where the capacitor 11 is connected to the DC link 20 is provided between the first current sensor 16 and the DC link capacitor 14.

The DC/DC converter 17 causes a change in the current of the capacitor 11 by changing a conduction ratio. The DC/DC converter 17 may have a boosting function or step-down function capable of changing the voltage. Between the DC/DC converter 17 and the connection point where the capacitor 11 is connected to the DC link 20, a DC reactor 18 (DCL) is connected in series to the DC/DC converter 17. The DC reactor 18 smooths a current that is outputted from the DC/DC converter 17 or that is inputted to the DC/DC converter 17. Between the DC/DC converter 17 and the DC link 20, a second current sensor 19 is connected in series to the DC/DC converter 17. The second current sensor 19 detects a current Ic that is discharged from the capacitor 11 or that charges the capacitor 11.

The controller 12 controls the DC/DC converter 17 to prioritize the charging and discharging of the capacitor 11 over the charging and discharging of the secondary battery 10. Specifically, the controller 12 includes a first control unit 12a and a second control unit 12b.

The first control unit 12a generates a current command value Ic* of the capacitor 11 (a target current value of the capacitor) based on a deviation of the current Ib of the secondary battery 10 from a predetermined current command value Ib* of the secondary battery 10 (a target current value of the secondary battery). The second control unit 12b generates a conduction ratio D of the DC/DC converter 17 based on a deviation of the current Ic of the capacitor 11 from the current command value Ic*, and outputs the conduction ratio D to the DC/DC converter 17. In this manner, the controller 12 directly controls the current of the capacitor 11 and indirectly controls the current of the secondary battery 10, and thus the flow of the current in the entire power storage system 100 is controlled. The predetermined current command value Ib* herein is set to 0 (zero) or a value close to 0 (zero). Accordingly, when load fluctuation occurs, the current Ib of the secondary battery 10 is restrained to the predetermined current command value Ib*. Therefore, the number of times of charging and discharging of the secondary battery 10 is restrained in accordance with the predetermined current command value Ib*. Consequently, the charging and discharging of the capacitor 11 are prioritized over the charging and discharging of the secondary battery 10.

The first control unit 12a generates the current command value Ic* of the capacitor 11 based on a current Ibsoc* for keeping the SOC (State Of Charge) (%) of the secondary battery 10 to a predetermined value and a deviation of the current Ib of the secondary battery 10 from the current command value Ib*. In this manner, the flow of the current in the entire power storage system 100 is controlled while restraining the fluctuation of the SOC of the secondary battery 10.

Next, a method of controlling the charging and discharging of the power storage system 100 is described in detail with reference to FIG. 1 to FIG. 3. FIG. 3 is a block diagram showing an example of the configuration of the controller 12 of the power storage system 100. It should be noted that, in the charging and discharging described below, the secondary battery 10 is used in a plateau region where its internal electromotive force Eb (V) is flat. For example, in the case of using the secondary battery 10 whose internal electromotive force Eb slopes when the SOC is no more than 40% or no less than 60%, the secondary battery 10 is used when the SOC is close to 50%.

Referring to in FIG. 1, while no active power is being supplied from the DC/AC inverter 13 to the load 200, the DC link voltage Vdc (V) applied to the DC link capacitor 14 is equal to the internal electromotive force Eb (V) of the secondary battery 10. As shown in Equation 1 below, the internal electromotive force Eb depends on the SOC (State Of Charge) (%) of the secondary battery 10, and is calculated by its function f (SOC (t)). The SOC in Equation 1 is represented by Equation 2 below. Ib in Equation 2 represents the current (A) of the secondary battery 10, and Qb0 in Equation 2 represents the rated capacity (Ah) of the capacitor 11.

$$Eb = f(SOC(t)) \quad \text{(Equation 1)}$$

[Math. 1]

$$SOC(t) = SOC(0) - \frac{100.0}{Q_{b0}} \int_0^t I_b \, dt \quad \text{(Equation 2)}$$

When load fluctuation occurs and active power Pac (W) is supplied from the DC/AC inverter 13 to the load 200, a current Idc (A) flows from the DC link capacitor 14 to the DC/AC inverter 13. The current Idc is represented by Equation 3 below. Vdc in Equation 3 represents a DC link voltage (V).

$$Idc = Pac/Vdc \quad \text{(Equation 3)}$$

Owing to the flow of the current Idc, a current Icdc (A) flows from the DC link capacitor 14. The current Icdc is represented by Equation 4 below. In Equation 4, Ic represents the current (primary-side current) (A) of the capacitor 11 at the primary-side (DC link capacitor 14 side) of the DC/DC converter 17.

$$Icdc = Idc - Ib - Ic \quad \text{(Equation 4)}$$

When the current Icdc flows through the DC link capacitor 14, the voltage (DC link voltage) Vdc of the DC link capacitor 14 drops. The DC link voltage Vdc is represented by Equation 5 below. In Equation 5, Cdc represents the capacitance (F) of the DC link capacitor 14.

$$Vdc = (-1/Cdc) \int Icdc \cdot dt \quad \text{(Equation 5)}$$

When the DC link voltage Vdc drops, a potential difference between the DC link voltage Vdc and the internal electromotive force Eb occurs, and a discharge current Ib (A) flows from the secondary battery 10 to the DC link capacitor 14. The discharge current Ib at the time is represented by Equation 6 below. In Equation 6, Rb represents the internal resistance (Ω) of the secondary battery 10.

$$Ib = (Eb - Vdc)/Rb \quad \text{(Equation 6)}$$

When the discharge current Ib flows, the first current sensor 16 detects and outputs the current Ib to the controller 12. As shown in FIG. 3, the controller 12 receives the current Ib from the first current sensor 16, and performs control to prioritize the charging and discharging of the capacitor 11 over the charging and discharging of the secondary battery 10 to supply active power Pac.

Specifically, active power Pac (t) (W) is supplied to the load 200 from the secondary battery 10 and the capacitor 11 via the DC/AC inverter 13. Accordingly, as shown in Equation 7 below, the active power Pac (t) is the sum of power Pb (t) (W) of the secondary battery 10 and power Pc (t) (W) of the capacitor 11, and is greater than 0 (W).

$$Pac(t) = Pb(t) + Pc(t), \; t > 0 \quad \text{(Equation 7)}$$

When the current command value Ib* of the secondary battery 10 (target current value of the secondary battery) is set to 0 (zero) (A), the power Pb (t) of the secondary battery 10 is brought close to 0 (W), resulting in a relationship represented by Equation 8 below, and the capacitor 11 is used in priority to the secondary battery 10 such hat the capacitor 11 covers the entire active power Pac (t). It should be noted that the current command value Ib* of the secondary battery 10 may be set not 0 (A) but to a value (A) close to 0 (zero), so long as the capacitor 11 is used in priority to the secondary battery 10.

$$Pac(t) = Pc(t), \; t > 0 \quad \text{(Equation 8)}$$

Accordingly, based on Equation 9 below, the first control unit 12a calculates an output power command value Pc* (W) of the capacitor 11 from a deviation (Ib*−Ib) of the current Ib received from the first current sensor 16, which is a deviation from the current command value Ib* of the secondary battery 10. In Equation 9, C1 (s) represents a transfer function.

$$Pc^* = C1(s) \cdot (Ib^* - Ib) \quad \text{(Equation 9)}$$

The first control unit 12a obtains the DC link voltage Vdc from the voltage sensor 15. Then, the first control unit 12a performs arithmetic operation in accordance with Equation 10 below to obtain the current command value Ic* of the capacitor 11 (target current value of the capacitor) from the DC link voltage Vdc and the output power command value Pc* obtained by Equation 9. The primary-side current command value Ic* is a current command value (A) of the capacitor 11 at the primary side (DC link capacitor 14 side) of the DC/DC converter 17.

$$Ic^* = Pc^*/Vdc \quad \text{(Equation 10)}$$

Next, the second control unit 12b obtains the current Ic of the capacitor 11 from the second current sensor 19. Then, based on Equation 11 below, the second control unit 12b calculates the conduction ratio D of the DC/DC converter 17 from a deviation (Ic*−Ic) of the current Ic from the primary-side current command value Ic*. In Equation 11, C2 (s) represents a transfer function.

$$D = C2(s) \cdot (Ic^* - Ic) \quad \text{(Equation 11)}$$

When the second control unit 12b outputs the conduction ratio D to the DC/DC converter 17, a primary-side current Ic flows from the capacitor 11. The current flows through the DC/DC converter 17 and the DC reactor 18 to the DC link capacitor 14. Power Pc (W) supplied to the DC link capacitor 14 at the time is represented by Equation 12 below.

$$Pc = Vdc \cdot Ic \quad \text{(Equation 12)}$$

As described above, the current command value Ib* of the secondary battery 10 is set to 0 (zero) or a value close to 0 (zero). Accordingly, the power Pc of the capacitor 11 is supplied to the load 200 as active power Pac. If the power Pc of the capacitor 11 is equal to the active power Pac, it means that the power Pc of the capacitor 11 is sufficient as the active power Pac. In this case, electric power is supplied to the load 200 only by the capacitor 11.

On the other hand, if the power Pc of the capacitor 11 is less than the active power Pac due to, for example, a decrease in the SOC of the capacitor 11 and/or limitation of the output current of the capacitor 11, then the power Pc of the capacitor 11 is insufficient as the active power Pac. As a result, the DC link voltage Vdc decreases, causing a potential difference between the DC link voltage Vdc and the internal electromotive force Eb. Consequently, a discharge current Ib (A) flows from the secondary battery 10 to the DC link capacitor 14, and power Pb of the secondary battery 10 as in Equation 13 below is supplied to the DC link capacitor 14. Electric power that is the sum of the power Pb of the secondary battery 10 and the power Pc of the capacitor 11 is supplied to the load 200 as the active power Pac.

$$Pb = Vdc \cdot Ib \quad \text{(Equation 13)}$$

Since the internal electromotive force Eb of the secondary battery 10 depends on the SOC of the secondary battery 10, it is necessary to control the SOC of the secondary battery 10 in addition to the above-described control of the current of the capacitor 11. Accordingly, the controller 12 obtains the current Ib of the secondary battery 10 from the first current sensor 16, and calculates the SOC (t) of the secondary battery 10 from Equation 2 shown above. From the SOC (t) of the secondary battery 10, the controller 12 calculates, in accordance with Equation 14 below, a current command value Ibsoc* used for keeping the SOC. In Equation 14, C3 is a correction term of the SOC (t). The controller 12 controls the SOC of the secondary battery 10 by correcting the current command value Ib* of the secondary battery 10 with use of the current command value Ibsoc*.

$$Ibsoc^* = C3 \cdot (SOC\ (t)) \quad \text{(Equation 14)}$$

Although in FIG. 3 the current command value Ibsoc* is added to the current command value Ib*, the current command value Ibsoc* may be alternatively added to the deviation of the current Ib from the current command value Ib*.

According to the above configuration, the current of the capacitor 11 is controlled based on the conduction ratio of the DC/DC converter 17, and thereby the current of the secondary battery 10 can be indirectly controlled and the flow of the current in the entire power storage system 100 can be controlled. Accordingly, the control parameters do not depend on load fluctuation characteristics, and thus the power storage system 100 is excellent in terms of versatility.

The charging and discharging of the capacitor 11 are prioritized over the charging and discharging of the secondary battery 10. As a result, the number of times of charging and discharging and the depth of charge and discharge of the secondary battery 10 can be reduced, which makes it possible to extend the life of the secondary battery 10.

As one example, the current command value Ib* of the secondary battery 10 is set to 0 or a value close to 0. In this manner, the charging and discharging of the capacitor 11 can be readily prioritized over the charging and discharging of the secondary battery 10.

It should be noted that the lower the current Ib at the time of charging/discharging of the secondary battery 10, the longer the life of the secondary battery 10. Accordingly, the current command value Ib* of the secondary battery 10 may be set to a value close to 0 (zero), for example, to a current value that is less than or equal to the one-hour current rate of the secondary battery 10. The "one-hour current rate" herein refers to a current value that allows the secondary battery to be charged from 0% to 100% of SOC (State Of Charge) in one hour, or a current value that allows the secondary battery to discharge from 100% to 0% of SOC in one hour. In this manner, the charge/discharge current Ib of the secondary battery 10 is limited to be less than or equal to the one-hour current rate (1 C). This makes it possible to suppress the advancement of degradation of the secondary battery 10, the advancement of degradation being caused when a current flowing through the secondary battery 10 is greater than a current flowing through the capacitor 11, and thereby the life of the secondary battery 10 can be extended.

The current command value Ib* of the secondary battery 10 may be set by the first control unit 12a to a value close to 0 (zero) by using active power Pac and a proportionality coefficient k, such that Ib*=k·Pac. In this manner, the current Ib of the secondary battery 10 can be increased and decreased in proportion to the output of the entire power storage system 100. At the time, the load sharing ratio of the secondary battery 10 to the capacitor 11 is k: (1−k). Accordingly, the load sharing ratio of the secondary battery 10 can be adjusted by the proportionality coefficient k. Therefore, if the SOC of the capacitor 11 has become less than or equal to a specified value during discharging, or if the SOC of the capacitor 11 has become greater than or equal to a specified value during charging, the charge/discharge current Ib of the secondary battery 10 can be increased by reducing the current command value Ic* of the capacitor 11.

(Working Example)

Next, regarding the extension of the life of the secondary battery 10 of the power storage system 100 with the above-described configuration, results of verification of the extended life of the secondary battery 10 according to a working example are described. Specifically, the life of the secondary battery 10 depends on the amount of heat generated the secondary battery 10. The greater the amount of heat generated by the secondary battery 10, the more the secondary battery 10 degrades and the shorter the life of the secondary battery 10 becomes. Therefore, the life of the secondary battery 10 was evaluated based on the amount of heat generated by the secondary battery 10 when the power storage system 100 was controlled in accordance with a charge/discharge pattern.

In the power storage system 100 according to the working example, the current command value ib* of the secondary battery 10 was set to 0 as in the example of control shown in FIG. 3, and the current of the capacitor 11 was controlled by the conduction ratio D of the DC/DC converter 17 calculated based on detection values Ib, Ic, and Vdc from the sensors 16, 19, and 15. On the other hand, in a power supply system according to a comparative example, a proportional compensator was used similar to the hybrid power supply system of Non-Patent Literature 1 described above, and a high-frequency component was separated by using a HPF (High Pass Filter), such that a low-frequency component of electric power was supplied by the secondary battery 10 and a high-frequency component of electric power was supplied by the electric double layer capacitor 11. Here, in order to use the capacitor 11 as much as possible, the time constant $T_{EDLC}$ of the HPF was set to be greater than the cycle of a charge/discharge pattern, and the proportional gain kp of the proportional compensator was set to a small value that is in such a range as not to reach the upper limit voltage and the lower limit voltage of the capacitor 11. Accordingly, the time constant $T_{EDLC}$ and the proportional gain kp vary in accordance with the cycle of the charge/discharge pattern and the voltage.

It should be noted that the configuration (the number of secondary batteries 10, the number of capacitors 11, each internal resistance, capacitance, etc.), the method of controlling the DC/DC converter 17, and the parameters were the same between the power storage system 100 of the working example and the power supply system of the comparative example. In the power storage system 100 of the working example and the power supply system of the comparative example, the capacity of the secondary battery 10 was set to 155.52 kWh so that a loss in the capacitor 11 could be sufficiently compensated for. The initial power amount of the capacitor 11 was set to 2.15 kWh.

In the verification, the power storage system 100 of the working example and the power supply system of the comparative example were controlled in accordance with two different types of charge/discharge patterns between which the magnitude of electric power and the charge/discharge frequency were different. Since a loss (internal loss) in the secondary battery 10 is entirely or substantially entirely converted into thermal energy, a loss amount Loss (kWh) was calculated as the amount of generated heat by Equation 15 shown below. In Equation 15, i represents the current (A) of the secondary battery 10, and R represents the internal resistance (Ω) of the secondary battery 10.

$$\text{Loss} = (3600/1000) \cdot \int i^2 \cdot R\, dt \quad \text{(Equation 15)}$$

In a first charge/discharge pattern, as shown in FIG. 4, electric power of 250 kW was discharged for five seconds (0.347 kWh). Then, after an interval of one second, electric power of 250 kW was charged for five seconds, followed by an interval of one second. This charge/discharge cycle of 12 seconds was repeated. In a second charge/discharge pattern, as shown in FIG. 5, electric power of 500 kW was discharged for fifteen seconds (2.083 kWh). Then, after an interval of two seconds, electric power of 500 kW was charged for fifteen seconds, followed by an interval of two seconds. This charge/discharge cycle of 34 seconds was repeated. Since the amount of electric power in the first charge/discharge pattern (0.347 kWh) is significantly less than the initial power amount of the capacitor 11 (2.15 kWh), the first charge/discharge pattern can be called light charge/discharge relative to the capacitor 11. Also, since the amount of electric power in the second charge/discharge pattern (2.083 kWh) is substantially the same as the initial power amount (2.15 kWh) of the capacitor 11, the second charge/discharge pattern can be called heavy charge/discharge relative to the capacitor 11.

As shown in FIG. 6, the verification results indicate that when charged and discharged in the first charge/discharge pattern, the loss amount Loss increased in both the working example and the comparative example in accordance with the elapse of time. Also, as shown in FIG. 7, when charged and discharged in the second charge/discharge pattern, the loss amount Loss increased in both the working example and the comparative example in accordance with the elapse of time. Over the entire time period in each of FIG. 6 and FIG. 7, the loss amount in the working example was less than the loss amount in the comparative example, and the difference between the loss amount in the working example and the loss amount in the comparative example increased in accordance with the elapse of time.

At the time point of 1200 (sec) in FIG. 6, the loss amount in the working example was 72.2% of the loss amount in the comparative example. At the time point of 1200 (sec) in FIG. 7, the loss amount in the working example was 51.3% of the loss amount in the comparative example.

As described above, the loss amount in the working example was less than the loss amount in the comparative example. Therefore, the amount of generated heat in the working example was less than the amount of generated heat in the comparative example. For this reason, it can be considered that, in the working example, thermal degradation of the secondary battery 10 was reduced, and thus the life of the secondary battery 10 was extended.

The difference between the loss amount in the working example and the loss amount in the comparative example as described above is derived from the electric power (kWh) of the secondary battery 10 and the current (A) of the secondary battery 10. Specifically, as shown in FIG. 8A, when charged and discharged in the second charge/discharge pattern in the working example, electric power is supplied only from the capacitor 11 at the start of discharging to the load 200. Accordingly, in accordance with a decrease in the SOC of the capacitor 11, electric power also starts to be supplied from the secondary battery 10. Next, while the system is not in operation, the supply of electric power from the secondary battery 10 ends, and during charging, electric power is supplied only to the capacitor 11. These features of the electric power shown in FIG. 8A are also applied to the current shown in FIG. 8B. Specifically, when charged and discharged in the second charge/discharge pattern in the working example, the current flows only from the capacitor 11 at the initial stage of the discharging, and in accordance with a decrease in the SOC of the capacitor 11, the current also starts to flow from the secondary battery 10. While the system is not in operation, the flow of the current from the secondary battery 10 ends, and during charging, the current flows only to the capacitor 11.

On the other hand, as shown in FIG. 9A, when charged and discharged in the second charge/discharge pattern in the comparative example, a high-frequency component of electric power is supplied only from the capacitor 11 via the HPF at the start of discharging. Thereafter, a low-frequency component of electric power is supplied from the secondary battery 10 and the capacitor 11. When charging ends (in about 20 seconds or 50 seconds), the proportional compensator operates to recover the SOC of the capacitor 11, so that electric power is supplied from the secondary battery 10 to the capacitor 11. When discharging starts (in about 35 seconds or 70 seconds) after the end of the charging, the SOC of the capacitor 11 becomes close to the upper limit. Accordingly, electric power from the load 200 is supplied to the secondary battery 10. These features of the electric power shown in FIG. 9A are also applied to the current shown in FIG. 9B. Specifically, when charged and discharged in the second charge/discharge pattern in the comparative example, the current flows only from the capacitor 11 at the initial stage of the discharging, and thereafter, the current flows also from the secondary battery 10. While the system is not in operation and until the middle stage of the charging, the current flows from the secondary battery 10. During the charging, the current flows to the capacitor 11. From the middle stage of the charging, the current also flows to the secondary battery 10.

As described above, in the power supply system of the comparative example, the SOC of the capacitor 11 rapidly increases and decreases due to the function of the HPF, and in response, the proportional compensator operates to compensate for the power command value of the capacitor 11. Accordingly, the current of the secondary battery 10 always flows not only during discharging but also during charging. On the other hand, in the working example, the current command value ib* of the secondary battery 10 is set to 0 (A), and thereby the output power command value Pc* of the capacitor 11 corresponding to the deviation of the current Ib of the secondary battery 10 from the current command value ib* is determined. Accordingly, no electric power from the secondary battery 10 is supplied to the capacitor 11. In this manner, in the working example, electric power is efficiently charged only to the capacitor 11. Thus, exchange of electric power between the secondary battery 10 and the capacitor 11 as in the comparative example is not performed in the working example. Consequently, in the working example, the loss amount (the amount of generated heat) is less than in the comparative example.

After charging and discharging of the secondary battery 10 of the working example had been performed for 1200 seconds in the second charge/discharge pattern shown in FIG. 10, the SOC (%) of the secondary battery 10 was 38.9%. Also, after charging and discharging of the secondary battery 10 of the comparative example had been performed for 1200 seconds in the second charge/discharge pattern shown in FIG. 11, the SOC (%) of the secondary battery 10 was 37.5%. Thus, the SOC of the secondary battery 10 of the working example was substantially the same as the SOC of the secondary battery 10 of the comparative example. It should be noted that, in both the working example and the comparative example, the SOC of the secondary battery 10 was 50% at the start of charging/discharging.

(Other Embodiments)

In the above-described embodiment, in the case of supplying DC power to the load 200, a DC/DC converter may be used as the power converter in place of the DC/AC inverter 13.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The power storage system and the method of controlling the same according to the present invention are useful, for example, as a highly versatile and long-lived power storage system and a method of controlling the same.

REFERENCE SIGNS LIST 10 secondary battery
11 capacitor
12 controller
12a first control unit
12b second control unit
13 DC/AC inverter
14 DC link capacitor
17 DC/DC converter
20 DC link
100 power storage system
200 load

The invention claimed is:

1. A power storage system comprising:
a power converter whose load-side terminals are connected to a load;
a secondary battery connected to power-supply-side terminals of the power converter;
a capacitor connected to the power-supply-side terminals of the power converter via a DC/DC converter in parallel to the secondary battery; and
a controller controlling the DC/DC converter to prioritize charging and discharging of the capacitor over charging and discharging of the secondary battery,
wherein the controller includes:
a first control unit that generates a target current value of the capacitor based on a deviation of a current of the secondary battery from a predetermined target current value of the secondary battery, the predetermined target current value being zero or close to zero; and
a second control unit that generates a conduction ratio of the DC/DC converter based on a deviation of a current of the capacitor from the target current value of the capacitor, and outputs the conduction ratio to the DC/DC converter.

2. The power storage system according to claim 1, wherein
the predetermined target current value of the secondary battery is a current value less than or equal to a one-hour current rate of the secondary battery.

3. The power storage system according to claim 1, wherein
the predetermined target current value of the secondary battery is zero.

4. The power storage system according to claim 1, wherein
the first control unit is configured to generate the target current value of the capacitor based on a current for keeping SOC of the secondary battery to a predetermined value and the deviation of the current of the secondary battery from the predetermined target current value of the secondary battery.

5. A method of controlling a power storage system, the power storage system including: a power converter whose load-side terminals are connected to a load; a secondary battery connected to power-supply-side terminals of the power converter; a capacitor connected to the power-supply-side terminals of the power converter via a DC/DC converter in parallel to the secondary battery; and a controller,
the method comprising:
generating, by the controller, a target current value of the capacitor based on a deviation of a current of the secondary battery from a predetermined target current value of the secondary battery, the predetermined target current value being zero or close to zero;
generating, by the controller, a conduction ratio of the DC/DC converter based on a deviation of a current of the capacitor from the target current value of the capacitor, and outputting, by the controller, the conduction ratio to the DC/DC converter; and
controlling the DC/DC converter by the controller to prioritize charging and discharging of the capacitor over charging and discharging of the secondary battery.

* * * * *